(12) United States Patent  (10) Patent No.: US 7,886,493 B2
Jorgensen et al.  (45) Date of Patent: Feb. 15, 2011

(54) CHAIN OPERATOR HOUSING

(75) Inventors: Thomas Friis Jorgensen, Holbaek (DK); Klaus Kornerup, Bikerød (DK)

(73) Assignee: VKR Holding A/S, Hoersholm (DK)

( * ) Notice: Subject to any disclaimer, the term of this patent is extended or adjusted under 35 U.S.C. 154(b) by 315 days.

(21) Appl. No.: 12/232,997

(22) Filed: Sep. 26, 2008

(65) Prior Publication Data

US 2009/0100757 A1   Apr. 23, 2009

Related U.S. Application Data

(62) Division of application No. 10/546,220, filed on Jul. 10, 2006, now abandoned.

(30) Foreign Application Priority Data

Feb. 25, 2003   (DK) ................................ 2003 00284

(51) Int. Cl.
   *E04F 15/22*   (2006.01)
(52) U.S. Cl. ...................... 52/403.1; 49/325
(58) Field of Classification Search ............... 52/403.1; 49/324, 325, 339, 340, 341, 342
   See application file for complete search history.

(56) References Cited

U.S. PATENT DOCUMENTS 4,014,136 A * 3/1977 Hemens et al. ............... 49/325
4,481,735 A * 11/1984 Jentoft et al. ................. 49/325
4,521,993 A * 6/1985 Tacheny et al. .............. 49/325
4,945,678 A * 8/1990 Berner et al. ................. 49/322
5,271,182 A * 12/1993 Greisner et al. .............. 49/325
5,406,750 A * 4/1995 Lindgren ...................... 49/325
5,829,199 A * 11/1998 Harvey et al. ................ 49/355
5,896,702 A * 4/1999 Waehrens et al. ............ 49/325

FOREIGN PATENT DOCUMENTS

EP   0 864 720   9/1998
EP   0 624 703   3/1999

* cited by examiner

*Primary Examiner*—Richard E Chilcot, Jr.
*Assistant Examiner*—Mark R Wendell
(74) *Attorney, Agent, or Firm*—Merek, Blackmon Voorhees, LLC

(57) ABSTRACT

A stop member for an operator chain in a chain operator, wherein the operator chain has a width, rivet holes and rivets, constitutes a pin arranged in a rivet hole not occupied by a rivet in the operator chain, wherein the pin has a length exceeding the width of the operator chain. The pin can be cylindrical with a diameter corresponding essentially to that of the rivet hole, and the diameter of the pin can be slightly smaller than that of the rivet hole, so as to be loosely held in the rivet hole.

3 Claims, 5 Drawing Sheets

CHAIN OPERATOR HOUSING

CROSS-REFERENCE TO RELATED APPLICATIONS

Figure 1:
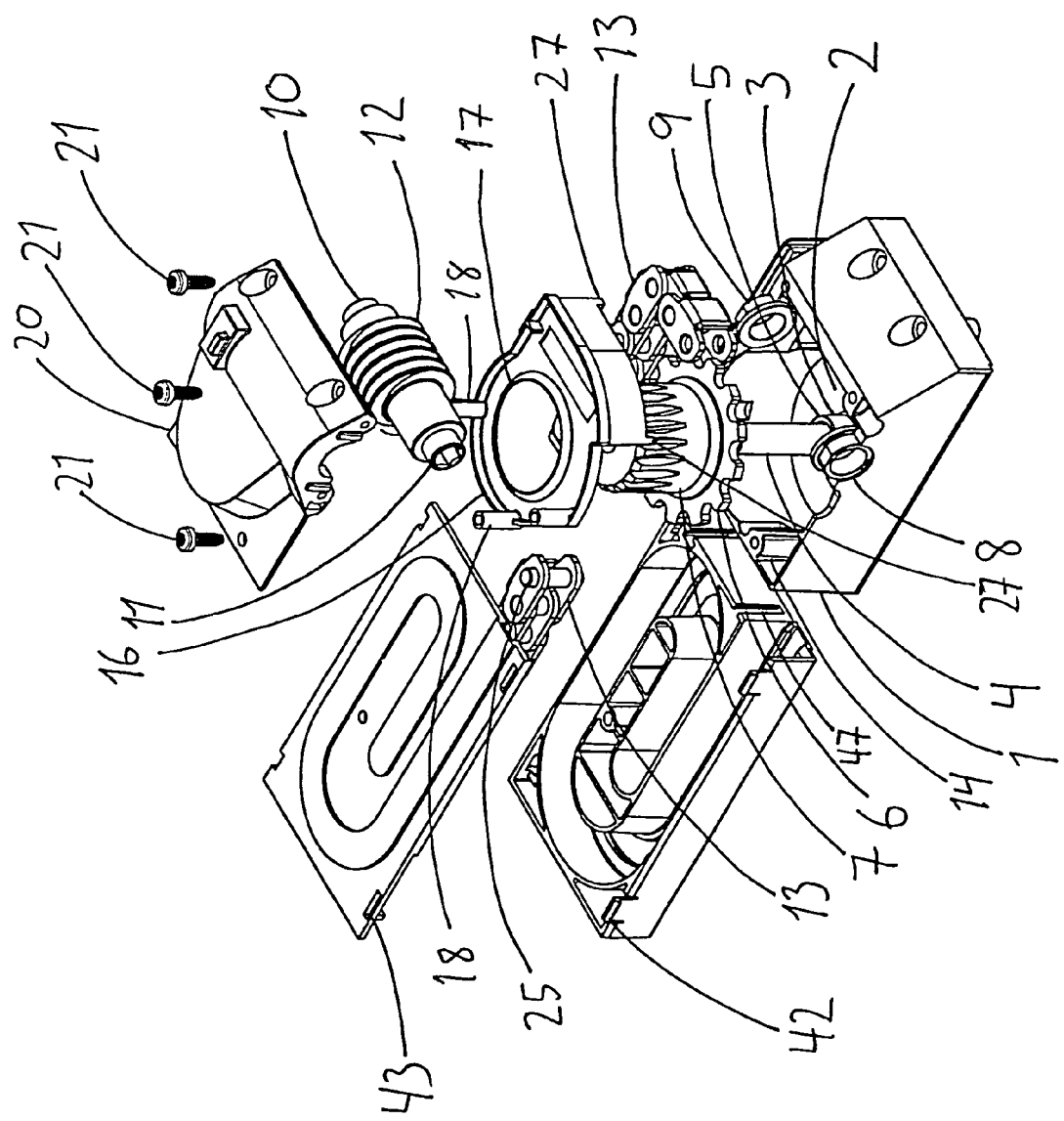

This application is a division of prior application Ser. No. 10/546,220, filed Jul. 10, 2006 now abandoned, which is hereby incorporated herein by reference in its entirety.

The present application claims the priority under 35 U.S.C. 119 of Danish Patent Application No. PA 2003 00284, filed Feb. 25, 2003, which is hereby incorporated herein by reference in its entirety.

The present application also claims the priority under 35 U.S.C. 120 of U.S. patent application Ser. No. 10/546,220, filed Aug. 18, 2005, which is hereby incorporated herein by reference in its entirety.

The present invention relates to a chain operator housing, in particular for a manually operated chain operator for windows.

Chain operators for windows are well known. Such chain operators generally comprise an operator chain housed in a magazine and a sprocket engaging the chain for driving it in and out of the magazine, thereby opening and closing a window, which is coupled to one end of the chain. The sprocket is integral with, or at least directly connected to, a coaxial gear wheel, which is coupled to a reduction mechanism. In its simplest form the reduction mechanism may be a worm gear, where the gear wheel constitutes the worm wheel, co-operating with the worm. Alternatively, the gear wheel could constitute the sun wheel of a planetary reduction gear. The sprocket and gears are mounted in a housing of which the chain magazine forms a part. The housing comprises an exit opening through which the chain may be driven in and out by the sprocket so as to operate the window. Examples of such chain operators are found in, e.g., U.S. Pat. No. 4,521,993 and EP-A-624703.

The presence of the exit opening, however, provides a problem in the sense that it allows moisture, dirt, salt, etc. to enter into the chain operator and affect the internal parts, such as the worm gear. In particular, if salty mist enters through the exit opening, these internal parts may corrode and eventually render the chain operator inoperable.

Evidently, the exit opening for the chain cannot be avoided. Moreover, the exit opening is not easily sealed because of the inherent irregularities of the chain.

EP-A-864720 describes a chain operator in which the electric motor and parts of the gear train are located in an extra housing within the chain operator.

It is the object of the invention to provide a chain operator that overcomes these prior art problems, and in particular to provide a chain operator that is resistant to corrosion caused by salty mist.

According to the invention, this object is achieved by an operator housing for a chain operator, wherein the housing comprises a barrier member for subdividing the interior of the housing into a chain compartment, which is open to the exterior, and a drive compartment, which is substantially sealed from the exterior, where the barrier member is a separate member insertable in the chain operator housing.

It has turned out that this is a simple and efficient way of preventing corrosion. In particular, it has turned out that the barrier member need not be airtight.

Thus, according to a preferred embodiment, the barrier member is an injection molded plastic member.

In order to obtain precise positioning of the barrier, the barrier member comprises positioning means cooperating with the housing.

In a preferred embodiment, the positioning means is devised such that, in the direction of the coaxial arrangement of the sprocket and gear wheel, the positioning means frictionally positions the barrier member.

This allows the barrier member to simply be pushed into the housing after the sprocket and gearwheel have been positioned.

According to another embodiment, the barrier member further comprises a bearing surface against which the chain may slide.

This gives good control over the chain motion and reduces friction.

According to yet another preferred embodiment, the housing comprises means for attaching a chain magazine.

This allows for the use of different chain magazines for the same operator, in particular, magazines with different sizes and containing different lengths of operator chains.

In another preferred embodiment, the housing comprises a substantially planar bottom wall and a protrusion extending externally over said bottom wall.

This allows for efficient positioning of the operator housing with respect to a window in which a corresponding positioning recess is provided.

According to another aspect of the invention, the object is achieved by means of a chain operator for windows, the chain operator comprising an operator chain, a housing comprising an exit opening for said operator chain, and a sprocket for driving said chain in and out of said exit opening, and at least one gear wheel in fixed coaxial connection with said sprocket, wherein a barrier member is arranged within said housing, said barrier member comprising a barrier arranged between said exit opening and at least the major part of said gear wheel.

Another problem of the prior art chain operators relates to the fact that, for different sizes of windows, different lengths of chain have to be used to open the window to a specific desired degree. In U.S. Pat. No. 4,521,993 a fixed length of chain is housed in a magazine formed by a track in the housing. If less than the full length is to be used, a blocking member in the form of a removable insert is placed in one of the driving spaces for the sprocket in the chain. This then blocks the space and prevents the sprocket from driving the chain any further than the insertion point.

Since the full length of chain is always used, the housing with the chain magazine has to be dimensioned to the longest foreseeable chain necessary for the different sized windows.

Apart from the fact that the use of a chain longer than actually necessary and the manufacturing of correspondingly larger housings than actually needed involves unnecessary material costs, it is also from an aesthetic point of view undesirable to have a chain operator that is larger than necessary fitted to the window. On the other hand, producing and storing a wide range of different operator housings also increase costs.

It is another object of the present invention to overcome this second problem.

The present invention solves this problem by providing a chain operator for windows, said chain operator comprising an operator chain, a housing comprising entry opening for said operator chain and an exit opening for said operator chain, and a sprocket for driving said chain in and out of said exit opening, wherein said housing comprises attachment means for attaching a chain magazine in communication with said entry opening.

In particular, the problem is solved by providing an operator housing for a chain operator, said housing comprising an entry opening and an exit opening for an operator chain, wherein the housing comprises attachment means for attaching a chain magazine in communication with said entry opening.

These measures allow the same chain operator, or even different chain operators with similar housings, to be used with different sized chain magazines adapted to the length of chain needed, where the chain magazine comprises attachment means adapted for cooperation with the housing of the chain operator.

Irrespective of the actual length of the chain, it is always important to avoid the sprocket driving the chain too far, i.e., out of engagement with the sprocket itself or even all the way out of the housing.

U.S. Pat. No. 4,521,993 addresses inter alia this problem. It is suggested to use, as the last chain link, a special link with protrusions that may abut a corresponding protrusion on a guide rib for the chain. If less than a full length of chain is to be used to open the window, it is suggested to place a removable insert in one of the driving spaces for the sprocket in the chain. This then blocks the space and prevents the sprocket from driving the chain any further.

The third problem that the present invention sets out to solve is to provide a simple and cheap end stop for the chain.

According to the invention, this is achieved by inserting in the rivet hole of the last link a stop element protruding over the link.

This is a simple way of providing a stop that will not pass the entry opening of the operator housing, which in turn prevents the chain from being driven too far.

A further problem with chain operators is their correct positioning in relation to the sash or frame on which they are to be mounted.

This fourth problem is solved by providing an operator housing for a chain operator, wherein the housing comprises a substantially planar bottom wall and a protrusion extending externally over said bottom wall.

In a preferred embodiment, a cylindrical wall extends internally from said bottom wall, said cylindrical wall portion defining a bore for holding a spindle on which a sprocket and gearwheel assembly is mounted.

The cylindrical wall with the bore provides stable mounting of the spindle.

Said stable mounting is improved in a further preferred embodiment where said bore extends at least partially through the substantially planar wall in a direction towards the external protrusion.

A particularly stable mounting is obtained when, according to more preferred embodiment, said bore extends through the substantially planar wall into the external protrusion, because the use of the additional room in the external protrusion allows the spindle to be supported over a longer distance by said bore than would otherwise be possible if the cylindrical wall alone should support the spindle.

In yet another preferred embodiment, the protrusion is cylindrical.

This minimizes the material costs because it allows the external shape to correspond to that of the bore, thus giving a constant wall thickness.

In yet another preferred embodiment, the end surface of the cylindrical wall forms a bearing surface for the sprocket and gearwheel assembly.

Figure 2:
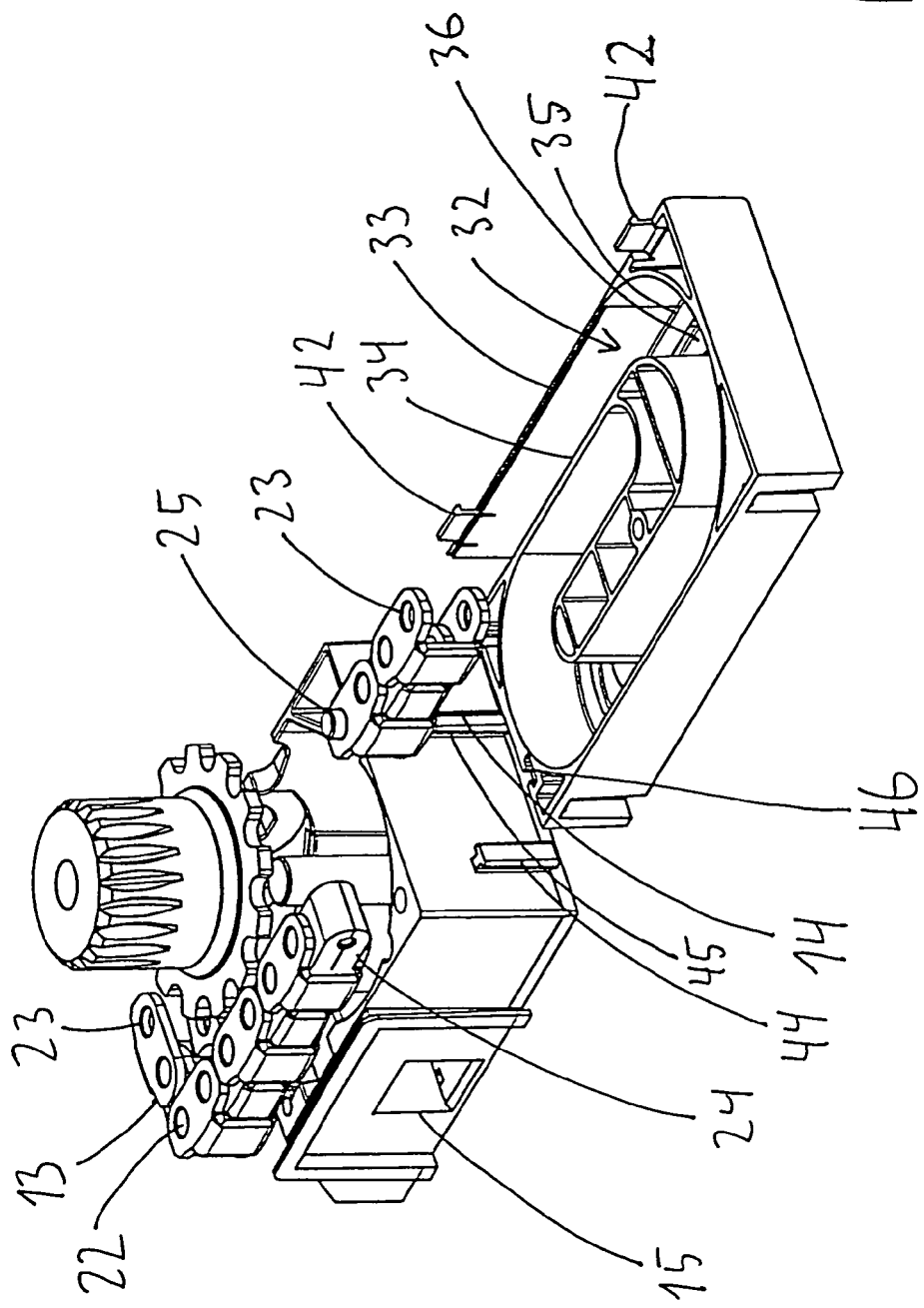
Figure 3:
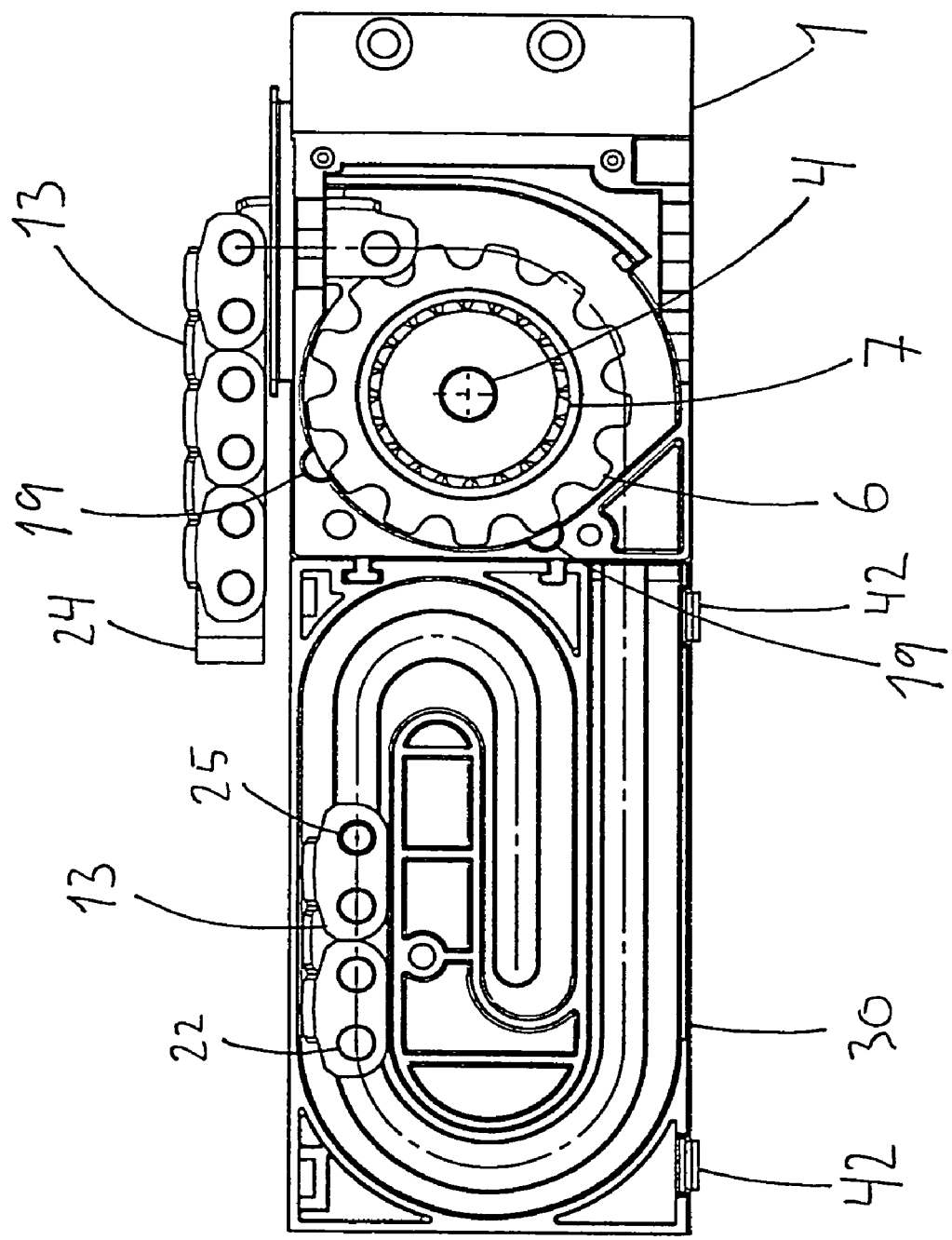
Figure 4:
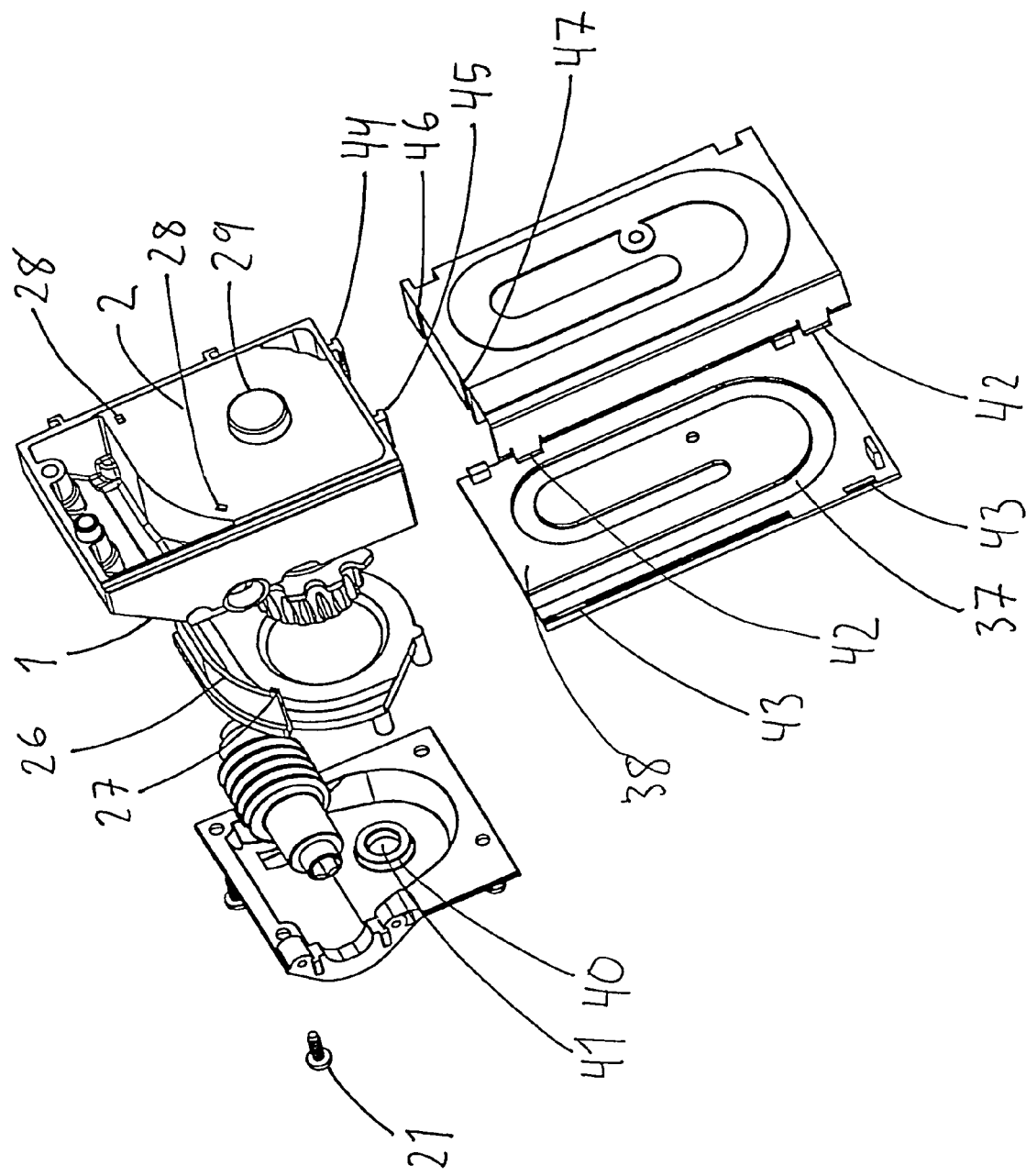
Figure 5:
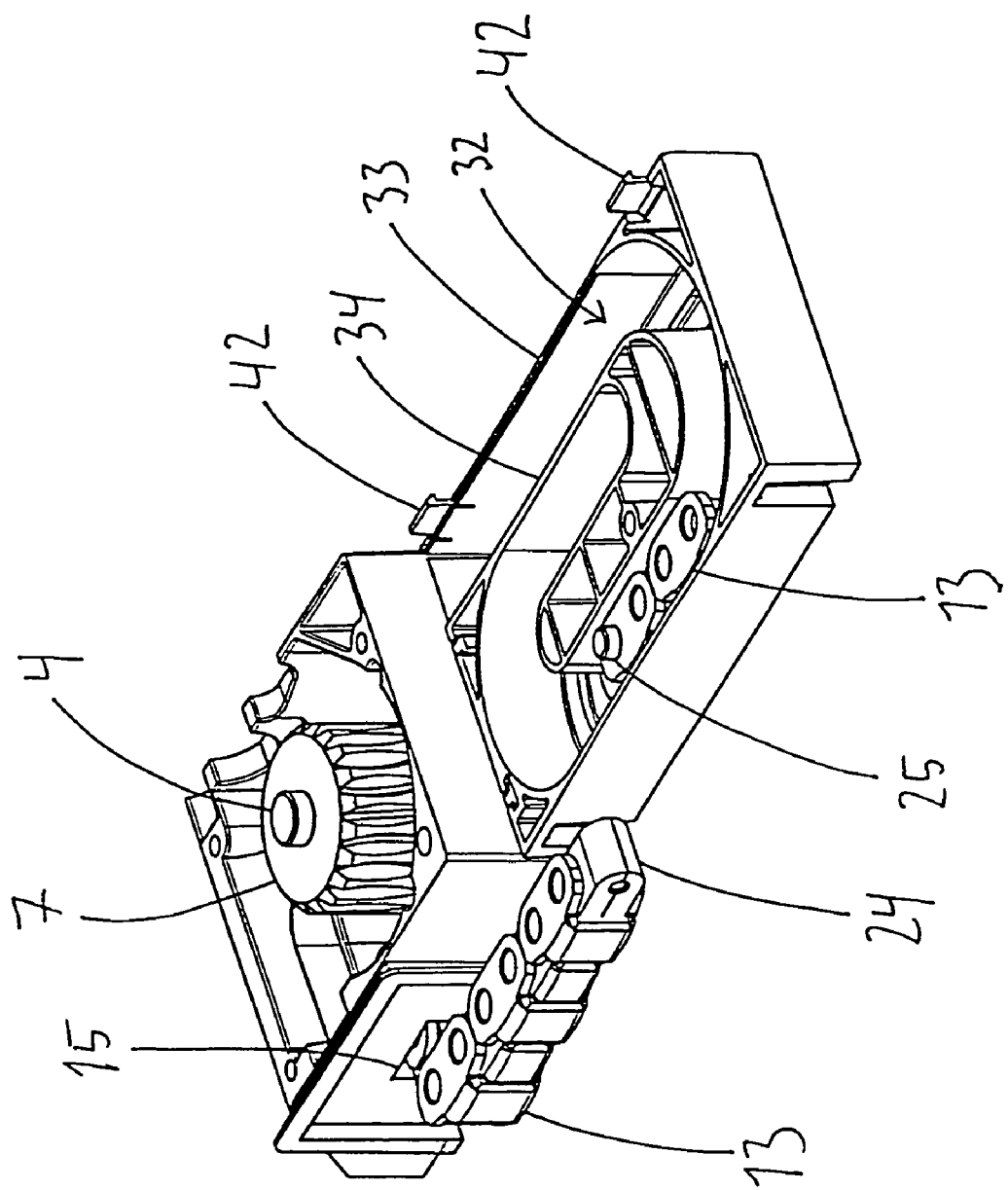

The invention will now be explained in greater detail with reference to the figures, in which FIG. 1 shows an exploded view of the chain operator housing and chain magazine of the present invention, FIG. 2 shows an exploded partial view of the chain operator housing and chain magazine according to the present invention, FIG. 3 shows a top plan view of the operator housing and chain magazine with the respective lids and the barrier member removed, FIG. 4 shows another exploded view of the operator housing and chain magazine, with bottom details visible, but without the chain, and FIG. 5 shows a perspective view of the chain placed in the operator housing and chain magazine.

FIG. 1 shows an exploded view of the chain operator of the invention. The operator comprises a cast metal housing 1, e.g., of pressure die-cast zinc. The metal housing 1 has substantially planar bottom wall 2. From the internal side of the bottom wall 2 an essentially cylindrical wall 3 extends. The cylindrical wall 3 defines a bore in which a spindle 4 is located in a fixed manner. The end surface 5 of the cylindrical wall 3 forms a bearing surface for a sprocket 6, which is arranged on the spindle 4. The sprocket 6 forms part of an assembly of the sprocket and a gearwheel 7. In the preferred embodiment, the assembly is formed by joining two separate parts in a fixed mechanical relationship, but it is to be understood that they could just as well be integrally formed or that they could be separate parts interlocking in the rotational direction only.

In cut-outs in the operator housing 1, two loosely fitted journal bearings 8 and 9 are located. These bearings serve as bearings for the opposite ends 10, 11 of a shaft carrying a worm 12 meshing with the gear wheel 7. One of the opposite ends 11 is provided with a coupling means for an external manual operating device (not shown). In the embodiment shown, the engagement means is a recess with a hexagonal cross section, but the skilled person will appreciate that any other coupling means, such as a hook, an eyelet, a hexagonal head portion, etc. could be used, and that different cross sections of the recess and the head portion could be used.

The operator housing 1 furthermore includes two openings for an operator chain 13, viz. an entry opening 14 and an exit opening 15, both best visible in the FIG. 2. As mentioned, the exit opening 15 is open to the external environment, and thus poses a problem in the sense that pollutants may enter into the operator housing 1 through it.

In order to protect the gear mechanism, which in the embodiment shown comprises the worm 12 and the gear wheel 7, a barrier member 16 is provided between the exit opening 15 and the gearwheel 7, preferably between the sprocket 6 and the gear wheel 7. The barrier member is preferably a separate injection molded, one-piece plastic part, e.g. of PBT, which may be inserted in the die-cast part of the operator housing 1. The barrier member 16 is provided with a central opening 17 through which the gearwheel 7 passes. In the preferred embodiment shown, the barrier member 16 further comprises a curved wall part 26 along which the operator chain 13 may slide during its motion. This lowers the friction as compared to friction against the die-cast zinc operator housing 1. The barrier member 16 is fixed in respect to the operator housing 1 by means of tubular friction locking members 18 held in corresponding grooves 19 in the operator housing 1, in which they are inserted. Furthermore, their length is adapted such that the barrier member 16 is furthermore positioned by means of a lid 20 covering the operator housing 1 and the end walls of the respective grooves 19. The lid 20 is preferably secured on the operator housing 1 by means of screws 21. In order to further ensure good positioning and to stabilize the curved wall part 26 of the barrier member 16 against the pressure form the operator chain 13, the curved wall part has protrusions 27 engaging corresponding holes 28 in the bottom wall 2 of the operator housing 1.

It has been found that, even though the barrier member 16 does not form a perfect seal along the inside of the walls of the operator housing 1 and around the gear wheel 7, protection against, in particular, corrosive salty mist entering through the exit opening 15 for the operator chain 13 is provided.

As has been already explained, from the internal side of the bottom wall 2 an essentially cylindrical wall 3 extends. The cylindrical wall 3 defines a bore in which a spindle 4 is located in a fixed manner. In this respect, however, the expression bore is to be understood as a generally cylindrical hole in a broad sense. In particular, it should be understood that it is not restricted to a prefabricated bore in which the spindle 4 is inserted. Thus, in the preferred embodiment, the spindle is secured in place during the die-casting, i.e., the zinc of the housing 1 is cast around one end part of the spindle 4, thereby forming the bore. This end part of the spindle may be provided with grooves, so as to hold the spindle securely in the housing 1.

In order to secure the spindle 4 as well as possible, a protrusion 29 is formed on the outside of the bottom wall 2 of the housing 1. This provides an additional thickness of the bottom wall 2, allowing the spindle to be inserted deeper into the housing wall without penetrating it. Thus, the spindle is supported over a longer distance by the cylindrical wall and the bottom part of the bore than would be possible without the protrusion 29. Preferably, the protrusion 29 is cylindrical. The cylindrical protrusion 29 furthermore provides a convenient means for positioning the operator with respect to a window. Hence, according to the invention the protrusion 29 serves dual functions.

The spindle is furthermore supported by means of a corresponding cylindrical wall 40 with a central bore 41 for receiving the free end of the spindle 4.

The operator chain 13 is of a generally known construction with links riveted together by means of short cylindrical pins 22 in pairs of holes 23 along the length of the operator chain 13. One end 24 of the chain 13 is preferably adapted for engagement with a part of the window. In order to prevent the operator chain 13 from being driven all the way out of engagement with the sprocket 6, a stop is provided at the other end of the operator chain 13. According to an advantageous aspect of the invention, this stop is a loosely held pin 25, simply being placed in the last existing hole of the operator chain 13 instead of a riveted pin. The loosely held pin 25 is preferably also cylindrical and has a diameter corresponding to that of the last hole in the operator chain 13. The length of the pin is longer than the width of the chain, i.e., longer than the rest of the short cylindrical pins 22. The length of the pin is adapted so as not to allow it to pass the entry opening 14 of the operator housing 1. When reaching the operator housing 2, the loosely held pin abuts it and prevents the operator chain 13 from moving any further in that direction. This provides a cheap and simple stop for the operator chain 13. Preferably, the loosely held pin 25 is made of steel.

This simple stop means conveniently allows for different lengths of operator chain 13 to be used. This is utilized in another aspect of the invention, in which the operator housing 1 is provided with means for attaching a separate operator magazine. The use of a separate operator magazine allows for the use of different sized magazines with the same operator housing 1, the size of the magazine being adapted to the length of operator chain 13 needed for a specific window.

In the figures, only one size of magazine is shown. The skilled person, however, will know that this is merely a matter of adapting the length of the magazine.

The magazine comprises two parts, viz., a housing part 30 and a lid part 31. The housing part 30 contains a generally spiral guideway 32 with sidewalls 33, 34 between which the chain 13 may slide. The bottom wall 35 of the guideway comprises a groove 36, in which one end of the loosely held pin 25 is received. The loosely held pin 25 may thus slide in the groove 36 during motion of the chain 13. Similarly, the lid part 31 comprises a corresponding groove 37 in which the other end of the loosely held pin 25 is received and may slide. In the assembled condition of the chain magazine, the overall height from the bottom of the groove 37 in the lid part 31 to the bottom of the groove 35 in the housing part 30 generally corresponds to the length of the loosely held pin 25. The overall height between the bottom surface 35 of the guideway 35 and the surface 38 the lid part 31, in which the groove 37 is provided, generally corresponds to the height of the entry opening 14. Thus, when that end of the chain 13 at which the loosely held pin 25 is located reaches the entry opening 14, the loosely held pin 25 cannot pass the entry 14 opening into the operator housing 1. The loosely held pin thus serves as a stop means for the chain 13 in conjunction with the wall of the operator housing 1 around the entry opening 14.

The magazine housing 30 and the magazine lid 31 are provided with mutually cooperating locking means, such as barbed resilient tabs 42 and holes 43. The skilled person will understand that this is only a preferred embodiment and know that the magazine lid 31 may be secured on the magazine housing 30 in many different ways.

The magazine is attached to the operator housing 1 in a releasable fashion, allowing different magazines to be attached to the same operator housing 1 or to identical operator housings 1 in an interchangeable way.

Preferably, this is done by means of elongate protrusions 44, 45 with T-shaped or L-shaped cross sections on the operator housing 1. These protrusions 25 may engage corresponding undercut grooves 46, 47 in the magazine housing 30 in a sliding fashion. The undercut grooves 46, 47 are permanently closed at one end, whereas the other end of the groove is closed by the magazine lid 31, when it is secured to the magazine housing 1. With the magazine lid 31 in place, the protrusions 44, 45 will thus be trapped between the magazine lid 31 and the magazine housing 30 and prevent the protrusions 44, 45 from disengaging the undercut grooves 46, 47.

Since the protrusions 44, 45 and undercut grooves 46, 47 are identical for different combinations of operator housings 1 and magazine housings 30, the magazines are readily interchangeable without the use of tools. This furthermore applies to the chains 13 as well, since the only thing preventing the chain 13 from being withdrawn fully from the operator housing 1 is the loosely held pin 25, which may simply be gripped with the fingers of a hand once the magazine lid 31 has been removed, the magazine lid 31 itself being removable upon pressing the barbed locking members 42 with a finger of a hand. With the pin removed, the sprocket 6 may be turned by means of the external manual operating device engaging the coupling means at one end 11 of the worm 12, as mentioned above, thereby driving the operator chain 13 entirely out of the operator housing 1.

Though in the preferred embodiment, a combination of T-shaped and L-shaped protrusions are used, the skilled person will know that other configurations are well possible, e.g., dovetail, keyhole shape, etc.

Also, though the above exemplary description of a preferred embodiment relates to a manually operated chain operator for windows, it should be noted that the principles of the invention are just as well applicable for electrically operated window operators, in which the electrical motor and gear transmission may be protected by the barrier member.

The invention claimed is:

1. A stop member for an operator chain in a chain operator, wherein the operator chain has a width, rivet holes and rivets, comprising a pin arranged in a rivet hole not occupied by a rivet in the operator chain, said pin having a length exceeding the width of the operator chain.

2. A stop member according to claim 1, wherein the pin is cylindrical with a diameter corresponding essentially to that of the rivet hole.

3. A stop member according to claim 2, wherein said the diameter of the pin is slightly smaller than that of the rivet hole, so as to be loosely held in said rivet hole.

* * * * *